United States Patent [19]
Pfeffer

[11] 3,761,595

[45] Sept. 25, 1973

[54] TREATING SKIN AND SCALP CONDITIONS

[76] Inventor: Philippe Pfeffer, c/o Plant, Ltd., Industrial Zone, Nathanya, Israel

[22] Filed: Mar. 25, 1970

[21] Appl. No.: 20,473

Related U.S. Application Data

[63] Continuation of Ser. No. 649,104, June 27, 1967, abandoned.

[30] Foreign Application Priority Data

July 3, 1966   Israel.................................... 26,082

[52] U.S. Cl. ................................................ 424/273
[51] Int. Cl. ............................................ A61k 27/00
[58] Field of Search .................................... 424/273

[56] References Cited
OTHER PUBLICATIONS

Merck Index – 1960 edition, page 217.

The Plant Alkaloids, Henry, 4th Ed., pp. 627–629 (1949).

Chem. Abst., Vol. 54 (1960) pg. 13161G

U.S. Dispensatory pages 843–847 (1926).

*Primary Examiner*—Sam Rosen
*Attorney*—Dean S. Edmonds et al.

[57] ABSTRACT

Pilosine compounds are received by extraction from the leaves of Jaborandi Microphylous.

Dermatological preparations containing a pilosine compound as an active ingredient and the method of treating various diseases of the skin and scalp by application to the afflicted areas of such a dermatological preparation.

6 Claims, No Drawings

TREATING SKIN AND SCALP CONDITIONS

This application is a continuation of my abandoned application Ser. No. 649,104 filed June 27, 1967.

BACKGROUND OF INVENTION

Pilosine and isopilosine are alkaloids corresponding to the formula:

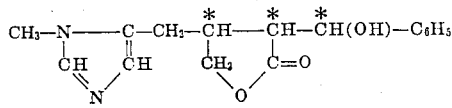

In the above formula the carbon atoms marked with an asterisk are asymmetric, and pilosine and isopilosine differ from each other by stereoisomerism at one of these three active carbon atoms.

Pilosine and possibly isopilosine occur in the leaves of the plant Jaborandi Microphylous in a total amount of about 0.05 percent by weight of the dried leaves. In the native leaves the amount of pilosine is overwhelming as compared to that of isopilosine, but isomerization occurs under mild alkaline conditions. The leaves of the Jaborandi Microphylous also contain the alkaloids pilocarpine and isopilocarpine, which are known and used in pharmacy.

FIELD OF THE INVENTION

The field of the invention relates to dermatological preparations, the method of utilizing the dermatological preparations to control diseases of the skin and scalp, and to the method of recovering pilosine and isopilosine alkaloids from the leaves of the Jaborandi Microphylous.

DESCRIPTION OF THE PRIOR ART

The recovery of pilocarpine and isopilocarpine from the leaves of Jaborandi Microphylous by way of extraction has been described in the literature (see, for example, H. Thomas—"The Plant Alkaloids;" F. Hamerslag—"Technology and Chemistry of Alkaloids;" G. Schwyzer—"Die Fabrikation der Alkaloide;" P. Lebeau—"Traite de Pharmacie Chimique;" and R. H. F. Manske and H. L. Holmes—"The Alkaloids" Vol. 3, 1953).

Some of these known processes for the extraction of pilocarpine and isopilocarpine operate under alkaline conditions and others under acidic conditions, but in none of them to applicant's knowledge is any pilosine or isopilosine recovered or obtainable.

Pilosine and isopilosine as well as various salts thereof are also known and were isolated and described by Pyman in the JOURNAL OF THE CHEMICAL SOCIETY, 101, 2260 (1912) and Leger and Rques Compte Rendus 155, 1008 (1912). Isopilosine was described more clearly by Voigtlander—Rosenberg Berichte der Deutschen Pharmazeutischen Gesell Schaft 292, 579 (1959).

Pilosine and isopilosine are characterized by the following:
Pilosine — m.p. 179°C. $[\alpha]_D$ 1 percent in alcohol = +84°
Isopilosine — m.p. 187°C; $[\alpha]_D$ 1.16 percent in chloroform = +40.2°
Isopilosine sulphate — m.p. 194–195°C; $[\alpha]_D$ 4.45 percent in $H_2O$ = +21°

SUMMARY OF THE INVENTION

This invention relates to dermatological preparations containing as an active ingredient a pilosine compound.

The invention further includes the method of treating various diseases of the skin and scalp by applying a dermatological preparation containing a pilosine compound as an active ingredient to the afflicted areas of the skin or scalp.

The invention further includes a novel process for the recovery of pilosine compounds in substantially pure form and at high yields from the leaves of Jaborandi Microphylous.

The terms pilosine compounds and a pilosine compound as used herein include pilosine itself as well as pharmacologically active derivations or derivatives thereof including isopilosine and the pharmacologically active salts of both pilosine and isopilosine.

The process of recovering pilosine compounds from the leaves of Jaborandi Microphylous involves three basic steps: (1) the extraction from the Jaborandi Microphylous leaves of substantially all of the pilocarpine, isopilocarpine, pilosine and isopilosine alkaloids under conditions which insure the extraction of pilosine and possibly isopilosine and to prevent destruction or degradation of the pilosine or isopilosine molecules; (2) the selective removal of substantially all of the pilocarpine and isopilocarpine from the extract; and (3) the recovery of the pilosine compounds from the mother liquor remaining after the removal of the pilocarpine and isopilocarpine in substantially pure form and in high yields. Each of the three basic steps as outlined above also involves subsidiary steps which are advantageous in obtaining optimum purity and yield of the pilosine compounds.

The first step of the process involves the extraction of substantially all of the pilocarpine, isopilocarpine, pilosine and isopilosine alkaloids from the leaves. The leaves, preferably in the dry ground form, are first soaked in an aqueous alkaline solution. The amount of aqueous alkaline solution, the alkali concentration thereof, and the time of this first soaking step should be sufficient to insure a thorough soaking of the leaves and that the leaves become mildly alkaline at a pH between about 7.5 and 8 to allow substantially total extraction of all of the alkaloids therefrom. This can advantageously be accomplished by soaking the dried leaves with about a 5 percent aqueous sodium carbonate solution utilizing about 80 percent by weight of the solution based on the dry weight of the dry Jaborandi leaves. Under these conditions the objectives of this first soaking step can generally be accomplished within two to two and one-half hours of soaking.

The use of different alkaline materials to accomplish the objective of rendering the leaves mildly alkaline will of course permit alterations in the concentration of the aqueous alkaline solution, time of soaking, and so forth, in order to bring the leaves to the required mild alkaline condition, as will be apparent to those skilled in the art.

Sufficient aqueous alkaline solution should be used to insure that the leaves are thoroughly soaked. This can advantageously be accomplished by utilizing about 80 percent by weight of the aqueous alkaline solution based on the weight of the dry Jaborandi leaves. The time in which the leaves are soaked can of course be varied, and it is advantageous to permit the leaves to soak in the aqueous alkaline solution at a pH of between about 7.5 and 8.0 for approximately two hours.

The soaked leaves are then extracted with a non-polar organic solvent capable of extracting substantially all of the pilocarpine, isopilocarpine, pilosine and isopilosine alkaloids. The solvent extract containing all of the alkaloids is then separated from the leaves in any suitable manner, such as filtration.

The non-polar solvent extract containing the alkaloids is then back extracted with a dilute aqueous acid solution by circulating the non-polar solvent extract through the dilute aqueous acid solution. The non-polar solvent used in the original extraction from the aqueous alkaline soaked leaves can then be re-cycled for further extraction of alkaline soaked leaves.

All of the alkaloids extracted from the soaked leaves with the non-polar solvent are thus contained in the aqueous acid solution in the form of the soluble salt of the acid used for the back extraction.

The aqueous acid solution containing all of the alkaloids is then advantageously neutralized, and any undissolved matter filtered off under substantially neutral conditions. The pH of the resulting clear mother liquor is then raised to between about 7.5 and 8, and as soon as possible thereafter the aqueous alkaline solution of the alkaloids is extracted with a non-polar solvent, preferably a chlorinated solvent such as dichloroethane. This extraction of the alkaline aqueous solution of the alkaloids is advantageously repeated a sufficient number of times in order to be sure of the extraction of substantially all of the alkaloids from the alkaline aqueous solution into the non-polar or chlorinated solvent. Three separate extractions with the non-polar solvent in this step are preferable and the non-polar solvent extracts combined.

These combined non-polar solvent extracts are then evaporated in vacuo at temperatures below about 50°C., leaving behind the alkaloid bases in semi-solid form.

The combined alkaloids are then dissolved in a dilute acid solution and the pilocarpine crystallized or precipitated therefrom in the form of the salt of the acid used to dissolve the alkaloid bases. Advantageously, the alkaloids are dissolved in a non-polar organic solution of a mineral acid such as hydrochloric acid in acetone and the pilocarpine crystallized by cooling the solution to about 0°C., preferaby −10°C. Under these conditions substantially all of the pilocarpine will crystallize out of the solution with about 24 hours as the pilocarpine hydrochloride. After crystallization of the pilocarpine hydrochloride, it can be removed from the mother liquor by any conventional procedure. The pilocarpine hydrochloride can then be re-crystallized by conventional procedures to produce a more pure product.

The mother liquor remaining after removal of the pilocarpine hydrochloride is then evaporated under conditions to prevent degradation of the pilosine or isopilosine molecules, and the remaining hydrochlorides in the mother liquor are converted into free bases by the addition of an aqueous alkaline solution to adjust the pH to between about 7.5 and 8.0. After adjustment of the mother liquor to a pH of between about 7.5 and 8, the mother liquor is extracted with a non-polar solvent such as dichloroethane. The resulting non-polar solvent extract is then evaporated to dryness in vacuo under conditions to prevent degradation of the pilosine and isopilosine content, and the residue treated with dilute mineral acid-polar solvent solution, advantageously an acetone-nitric acid solution. The polar solvent-acid solution is then cooled to about 0°C., preferably −10°C., for approximately 24 hours, which results in the crystallization of the isopilocarpine content therefrom, as well as any remaining traces of pilocarpine in the form of the respective nitrates. The isopilocarpine and pilocarpine nitrates are removed by conventional procedures from the mother liquor.

The remaining mother liquor after removal of the isopilocarpine and pilocarpine nitrates is then again concentrated in vacuo under conditions to prevent degradation of the pilosine and isopilosine molecules, and the pH of the solution is raised to between about 7.5 and 8.0 by the addition of a dilute, preferably 10 percent, aqueous alkaline solution. The pilosine and possibly isopilosine is then extracted from the aqueous alkaline solution with a non-polar solvent such as dichloroethane, and the resulting non-polar solvent extract is again concentrated in vacuo under conditions which prevent degradation of the pilosine compounds. The concentration in vacuo preferably should be carried out until the resulting product is of a syrupy form.

A polar solvent is then added to the syrupy extract, and the solution is cooled to about 0°C. and allowed to stand for approximately 24 hours, during which time the pilosine and isopilosine crystallize. The pilosine and isopilosine crystals are then removed from the polar solvent solution by filtration.

The pilosine and isopilosine compounds are then advantageously further purified by dissolving the crude product in a mineral acid such as sulfuric acid, filtering the acid solution advantageously through charcoal and recovering the resulting clear solution containing a mixture of substantially pure pilosine and isopilosine. The pilosine and isopilosine are then precipitated from the clear acid solution by the addition of an aqueous alkaline solution, such as sodium carbonate, in such an amount that the pH is adjusted to the range of from between about 7.2 and 7.7.

Various non-polar solvents can be used in the extraction steps described above. It is advantageous, however, to use benzene in the first extraction of the alkaline soaked leaves and to use a chlorinated solvent such as dichloroethane in the subsequent extraction steps. Additional examples of non-polar solvents that can be used for the extraction steps include chlorinated solvents such as chloroform and methylene chloride.

Various dilute acid solutions can also be used in the back extraction step or for the acidification steps described above, included in which sulfuric acid, acetic acid, and tartaric acid may be mentioned by way of examples.

In the alkalization steps described above, various aqueous alkaline materials can be used in adjusting the pH's of the various solutions, including carbonates such as sodium carbonate and sodium bicarbonate, and alkali metal hydroxides such as sodium hydroxide.

Various polar solvents can be used where indicated above and particularly with respect to the precipitation of the crude pilosine and isopilosine products, for example, ketones such as acetone, as will be apparent to those skilled in the art.

In practicing the process of this invention to assure extraction of pure pilosine compounds at high yields, there are three important and critical factors which must be controlled. These factors include control of the alkaline pH during the soaking of the leaves as well as during the various extraction steps which take place under alkaline conditions, the time during which the leaves and the alkaline extracts are subjected to alkaline conditions, and the temperature utilized while the leaves and various extracts are under alkaline conditions.

When the leaves and the various extracts are subjected to alkaline conditions, the pH should be maintained between about 7.5 and 8. PH's of slightly less than 7.5 and slightly above 8 could of course be used, but the yields of the pilosine compounds come down to about nil at a pH of about 10 to 11 or 6.8 to 7. This is due to the fact that pilosine compounds cannot be extracted in any significant amounts with organic solvents under acidic conditions. Under pH conditions above about 8, such as 10 to 11, the pilosine compounds are essentially destroyed by opening of the lactone ring.

The time of soaking of the leaves or the time during which the various extracts are subjected to alkaline conditions, even between the pH's of 7.5 to 8, is also important since prolonged alkaline action will also result in the destruction of the pilosine compounds even at fairly low temperatures. It is, therefore, important that the extraction of the pilosine compounds under alkaline conditions is accomplished quickly, but of course the time should be sufficiently prolonged to assure substantially complete extraction of the pilosine compounds.

The temperature of the leaves and the various extracts while under alkaline conditions should also be carefully controlled, even during the use of the mild alkaline conditions between a pH of about 7.5 to 8. Optimum results both with respect to yield and purity take place when the temperature of the alkaline leaves and extracts is maintained at about 50°C. Temperatures much below 45°C. or above 55°C. significantly affect the yield of the pilosine compounds. Higher temperatures could of course be used in some instances, such as in the production of isopilosine, but the time during which these higher temperatures are maintained should be of short duration.

DESCRIPTION OF THE PREFERRED EMBODIMENTS

EXAMPLE 1

1000 kg. of dry Jaborandi Microphylous leaves were soaked with 800 liters of a 5 percent sodium carbonate aqueous solution. The dried leaves were permitted to soak in the alkaline solution for approximately two hours, during which time the pH of th soaked leaves was maintained between about 7.5 and 8.

The soaked leaves were then extracted with 50,000 liters of benzene. During extaction the temperature was maintained between 45°-55°C. The extraction was accomplished by circulating the benzene through the soaked leaves as rapidly as practical but for sufficient time to extract substantially all of the alkaloid content (95–98 percent) therefrom. Substantially complete extraction of the alkaloids from the soaked leaves was accomplished in this particular examples over a period of about two and one-half hours.

The resulting benzene extract was then circulated through 500 liters of a 10 percent aqueous acetic acid solution, and the benzene emerging from the solution was recycled for further extraction of alkaline soaked leaves. After about two hours, the extraction of the total alkaloid content into the acetic acid solution was completed and the total alkaloid content of the leaves dissolved in the form of acetates in the aqueous solution. The solution contains between about 95 to 98 percent of the total alkaloid content of the leaves. It is advantageous to maintain the concentration of the total alkaloid content in the aqueous acetate solution between about 4 to 5 percent.

The aqueous acid solution was then neutralized to a pH of 7 and undissolved matter filtered off and discarded.

The pH of the resulting clear solution was then raised to 8.0 and very quickly extracted with dichloroethane solvent. This extraction is most advantageously accomplished in stages, such as with three portions of dichloroethane of 100 liters each. The dichloroethane extracts were then combined and the solvent evaporated in vacuo, leaving behind the alkaloid bases in the amount of about 10 kg.

Ten liters of an acetone solution of hydrochloric acid was then added to the above residue. Sufficient hydrochloric acid was used to accomplish complete neutralization of the free bases and to bring the pH of the mixture to about 5. The acidified solution was then cooled to −10°C. and was left standing for 24 hours, after which pilocarpine-hydrochloride crystallized out and was removed by centrifugation. The pilocarpine-hydrochloride can be re-crystallized for further purification by conventional procedures if desired.

From the resulting mother liquor the acetone was evaporated and the remaining hydrochloric acids converted to free bases by the addition of sodium carbonate to bring the pH up to between about 7.5 and 8.

The alkaline mother liquor was then extracted with dichloroethane. The resulting dichloroethane extract was then evaporated in vacuo, and the residue was treated with a 10 percent acetone-nitric acid solution. The mixture was left to stand for twenty-four hours at −10°C., which resulted in the crystallization of isopilocarpine and any remaining pilocarpine in the form of the respective nitrates.

The resulting mother liquor was removed and concentrated in vacuo and the pH raised to 8 by the addition of 10 percent aqueous sodium carbonate solution. The alkaline mother liquor was then extracted with dichloroethane solvent and the resulting dichloroethane was concentrated in vacuo to dryness and 6 liters of acetone added.

The acetone solution was cooled and after 24 hours, pilosine and isopilosine crystallized. The crude pilosine and isopilosine were then filtered off and dissolved in 6 liters of dilute sulfuric acid, using sufficient sulfuric acid to insure that the pilosine and isopilosine were dissolved. The sulfuric acid solution was then filtered through charcoal and sufficient aqueous sodium carbonate solution was added to the resulting clear solution t adjust the pH of the solution to the range from about 7.2 to 7.7. A pH range of about 7.2 to 7.7 is important in this step since no substantial precipitation of pilosine or isopilosine occurs much above or below the stated pH range.

The above Example utilizes Jaborandi Microphylous as a source of the pilosine compounds, but the invention does not exclude the use of other natural sources in which pilosine compounds exist.

EXAMPLE 2

For the isomerization of pilosine into isopilosine one kg. of the above pure mixture was introduced into 5 liters of a 5 percent aqueous sodium hydroxide solution. The mixture was quickly heated to 100°C. whereupon all the pilosine dissolved. The undissolved matter was filtered off and to the clear filtrate a 50 percent aqueous sulfuric acid solution was added until the pH dropped to 1. The solution was then heated for 10 minutes to 100°C., cooled to 20°–25°C. and 600 cc. of a 10 percent aqueous sodium hydroxide solution was added gradually till the pH dropped to 7.2–7.5. The solution was then left to stand for 20 hours whereafter the crystallization of the isopilosine was completed. M.p. 178°–180°C. $[\alpha]_D$ 1 percent in alcohol = +39 –40°.

The above product was re-crystallized from alcohol whereupon the melting point was raised to 185°–187°C.

EXAMPLE 3

Dried isopilosine was suspended in two volumes of isopropyl alcohol (twice the quantity of isopropyl alcohol in relation to the weight of the isopilosine) and the solution was heated to 80°C. A 1:1 volumetric mixture of sulfuric acid and isopropyl alcohol containing a stoichiometric quantity of the acid was added to the above solution and the reaction mixture was then cooled. A precipitate of isopilosine sulphate was obtained. The precipitate was filtered off and dried and the pure sulphate was obtained in a 93 percent yield. A further crop of 5 percent was obtained by the concentration of the mother liquor so that a total yield was 98 percent of the theory. M.p. 194°–195°C; $[\alpha]_D$ 4.45 percent in $H_2O = +21$ percent.

Isopilosine tartrate was prepared in a similar manner. M.p. 135°–136°C; $[\alpha]_D$ 3.8% $H_2O = -22.2$ percent. Other active salts can also be prepared by processes similar to that of Example 3 such as the hydrochloride, as will be apparent to those skilled in the art.

The following are examples of various dermatological preparations which can be prepared and utilized according to this invention and include lotions, shampoos, ointments and creams.

| | |
|---|---|
| (i) Pilosine/Isopilosine sulphate | 4 |
| Alcohol 50° | 96 |
| (ii) Pilosine/Isopilosine sulphate | 4 |
| Water | 96 |
| (iii) Pilosine/Isopilosine tartrate | 4 |
| Isopropyl alcohol | 96 |
| (iv) Pilosine/Isopilosine sulphate | 2 |
| Castor oil | 10 |
| Alcohol | 88 |
| (v) Pilosine/Isopilosine sulphate | 4 |
| Castor oil | 10 |
| Shampoo | 86 |
| (vi) Pilosine/Isopilosine hydrochloride | 4 |
| Cetrimide* | 4 |
| Shampoo | 92 |
| (vii) Pilosine/Isopilosine sulphate | 4 |
| Cetyl alcohol | 5 |
| Water | 10 |
| Polyethylene glycol as ointment base | 81 |
| (viii) Pilosine/Isopilosine sulphate | 2 |
| Cetrimide* | 2 |
| Castor oil | 5 |
| Sodium laurylsulphate | 1 |
| Cetyl alcohol | 15 |
| Water | 35 |
| White soft paraffin | 40 |

*A mixture containing mainly tetradecyltrimethylammonium bromide together with smaller amounts of dodecyl- and hexadecyl-trimethylammonium bromides.

All of the lotions, shampoos, ointments and creams described in the foregoing Examples are given for illustration only. Other compositions can be prepared in which the relative proportions of the active material and the vehicles and adjuvants are different. Also different salts of pilosine and isopilosine can be used. The compositions may also be in powderous form. Various other pharmacologically or dermatological materials can also be used in admixture therewith so long as they do not interfere with the utility or function of the pilosine compounds.

The preparations according to the invention are useful, among others, against acne and disorders of the scalp such as Seborrhea Capitis, Psoriasis Capitis and the like.

The toxicity test of isopilosine gave the following results:

1. $LD_{50}$ (i.v.) = 144 mg/kg
2. $LD_{50}$ (i.p.) = 470 mg/kg
3. $LD_{50}$ (s.c.) = 660 mg/kg
4. $LD_{50}$ (per os) = 900 mg/kg It is thus seen that isopilosine is essentially non-toxic. The toxicity of the salts is even lower.

Allergologic tests by the Schelansky-Draize method and patch or open tests have shown absolutely no sensibilization or irritation on 240 patients treated.

The preparation used for the tests was a transparent, odourless and colourless 4 percent by weight solution of isopilosine sulphate in 30 percent alcohol. Patients suffering from Seborrhea Capitis, and Psoriasis were given bottles of 50 cc. of the above solution. They were instructed to divide the scalp into four areas and on successive days to rub a separate one of the areas gently, twice daily, with a piece of gauze or cotton previously immersed in the solution. By this procedure each area was treated every four days.

The patients were allowed to wash their hair every 7 to 14 days, using a regular shampoo. On the day of hair washing the treatment was suspended.

The results are tabulated in the following Table I:

Table I

TABLE I

| Disease | No. of patients | Markedly improved | No change |
|---|---|---|---|
| Seborrhea | 27 | 21 | 6 |
| Psoriasis Capitis | 9 | 7 | 2 |

In cases of acne with predominance of blackheads or micro-cysts, the disappearance of the shiny, greasy or seborrheic aspect of the skin was noticed as well as a physical modification of the blackheads, or the micro-cysts, making them more accessible to thereapeutics such as extraction. The ease of extraction of blackheads is most constant and apparent while the lotion is in use, even in cases of polymorphic acne.

The lotion was remarkably well tolerated on all patients. On all patients tested by allergological methods, no irritation or early or delayed reactions were found.

I claim:

1. A method of topical treatment to control Seborrhea Capitis, Psoriasis Capitis, and acne comprising applying to the afflicated area of the host a composition containing as an active ingredient pilosine, isopilosine active salts thereof, or mixtures thereof in a nontoxic carrier suitable for topical application to the skin and scalp, said active ingredient being present in an amount sufficient to control said diseases of the skin and scalp.

2. The method of claim 1 in which the compound is present in about 2 percent by weight.

3. The method of claim 1 in which the pilosine compound is pilosine.

4. The method of claim 3 in which the pilosine compound is in the form of an acid addition salt.

5. The method of claim 3 in which the pilosine compound is isopilosine.

6. The method of claim 5 in which the isopilosine is in the form of an acid addition salt.

* * * * *

UNITED STATES PATENT OFFICE
CERTIFICATE OF CORRECTION

Patent No. 3,761,595        Dated September 25, 1973

Inventor(s)    Philippe Pfeffer

It is certified that error appears in the above-identified patent and that said Letters Patent are hereby corrected as shown below:

On the cover sheet [76] "Philippe Pfeffer, c/o Plant. Ltd." should read -- Philippe Pfeffer, c/o Plantex, Ltd. --. same cover sheet insert -- [73] Assignee: Plantex, Ltd., Nathanya, Israel, a corporation of Israel. --.

Signed and sealed this 27th day of August 1974.

(SEAL)
Attest:

McCOY M. GIBSON, JR.            C. MARSHALL DANN
Attesting Officer                Commissioner of Patents